Aug. 4, 1959
B. DE HAVEN MILLER ET AL
2,898,092
APPARATUS FOR PROCESSING VIOLENTLY
MIXED FLOWABLE MATERIALS
Filed Sept. 13, 1957
2 Sheets-Sheet 2
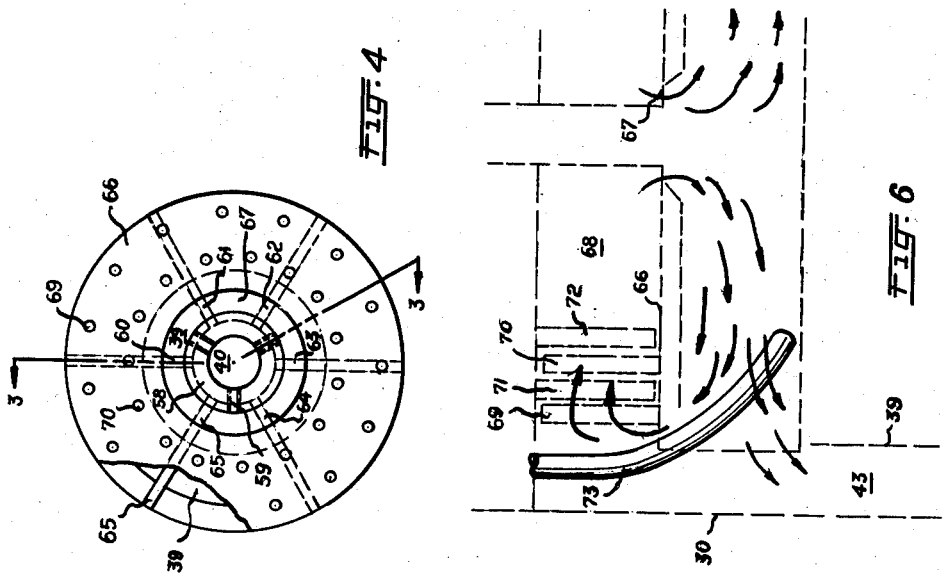
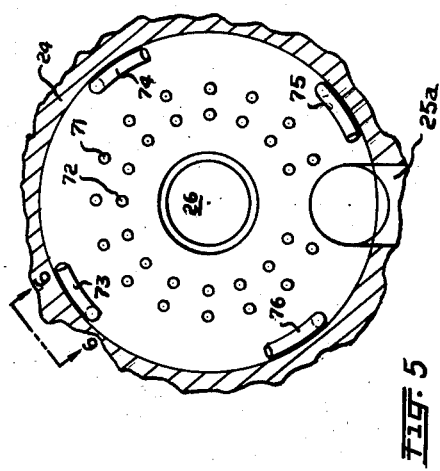
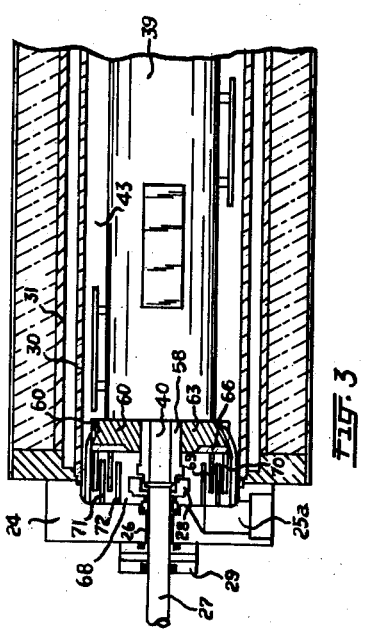
INVENTORS
BRUCE DE HAVEN MILLER
JOHN P. BOLANOWSKI
GEORGE W. REIGEL
BY HENRY W. BEVARLY
W. E. Sherwood
ATTORNEY

United States Patent Office 2,898,092
Patented Aug. 4, 1959

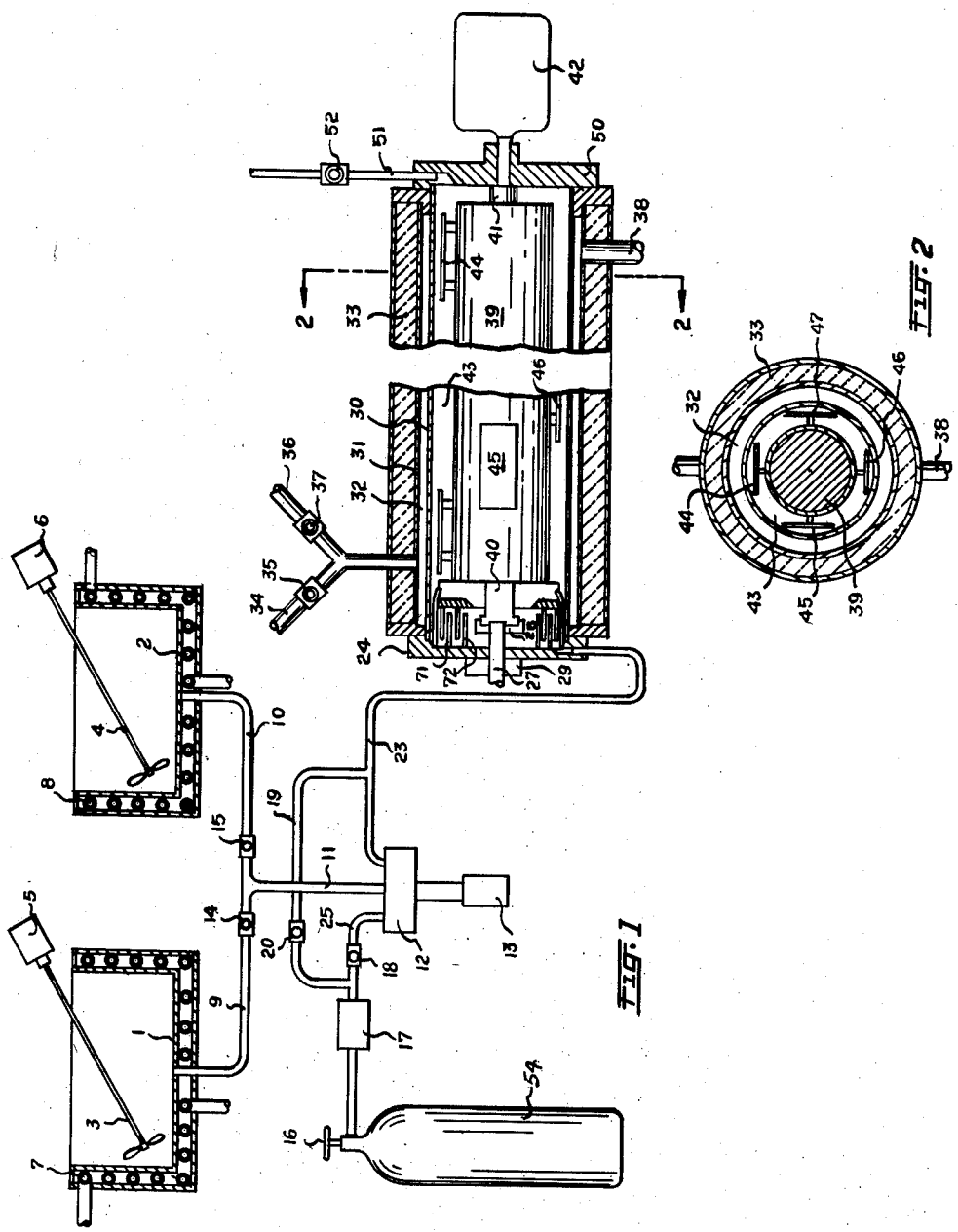

2,898,092

APPARATUS FOR PROCESSING VIOLENTLY MIXED FLOWABLE MATERIALS

Bruce De Haven Miller, Louisville, Ky., George W. Reigel, Clarksville, and John P. Bolanowski, Jeffersonville, Ind., and Henry W. Bevarly, Louisville, Ky., assignors to Chemetron Corporation, a corporation of Delaware Application September 13, 1957, Serial No. 683,728

11 Claims. (Cl. 259—10)

This invention relates to a new and improved apparatus for processing flowable materials and, more particularly, to an apparatus in which such materials are violently mixed during their processing. It further relates to an apparatus in which the flowable material may be continuously passed through a chamber under superatmospheric pressure and be simultaneously mixed, agitated, emulsified or otherwise treated with or without temperature change. Apparatus embodying the invention may be used in processing cake batters, or in conducting chemical processes in which various agents may be reacted, or in making emulsions, such as mayonnaise, salad dressings, paints or other products, or for incorporating a gas under pressure in a liquid, or for various other purposes. For purpose of illustration, the invention is described in the use for processing an angel food cake batter, but it will be understood that it is in no way intended to be limited to this particular usage.

An object of our invention is to provide an improved apparatus for processing flowable materials including a violent mixing of the material incorporating a recirculation of a substantial volume of previously mixed material repeatedly through the mixing stage, and while contained within a pressure chamber.

Another object is to provide an improved apparatus for processing flowable materials including a rotatable shaft and pump having means arranged for violently mixing the material while contained within a pressure chamber and without necessitating unduly high shaft speeds.

Another object is to provide an improved system for processing flowable materials under pressure and including a rotatable shaft apparatus for recirculating a substantial volume of the material through a mixing stage located within a pressure chamber, the amount of material being recirculated being jointly dependent upon the rate of flow of the material through the chamber and upon the speed of the shaft.

A further object is to provide an improved apparatus for processing flowable materials and including a pressure chamber having a detachable cover and a removable shaft and including means for violently mixing and recirculating material contained within the chamber and wherein different covers with attachments, or different shafts, or both different covers and different shafts, may be employed upon the same chamber for processing of different materials.

Still a further object is to provide an improved apparatus for processing flowable materials including a violent mixing of the material incorporating a recirculation of a substantial volume of previously mixed material repeatedly through the mixing stage and while subjected to heat treatment.

Other objects and advantages of our invention will become apparent as the description proceeds and when considered in conjunction with the accompanying drawing in which:

Fig. 1 is a diagrammatic view, partly in section, of a system for processing flowable materials in accordance with our invention;

Fig. 2 is a sectional view through the pressure chamber taken on line 2—2 of Fig. 1;

Fig. 3 is a view partly in section of the inlet end of the pressure chamber, the pump impeller being shown in a section taken on line 3—3 of Fig. 4 and to a smaller scale;

Fig. 4 is an end elevation of the pump impeller and shaft as viewed in the discharge direction of the chamber and with portions broken away;

Fig. 5 is an end elevation of the central portion of the chamber cover as viewed in the inlet direction of the chamber; and Fig. 6 is a schematic view of the recirculating flow of material with respect to the stationary vanes as viewed along line 6—6 of Fig. 5.

In accordance with our invention, we provide an elongated stationary cylindrical pressure chamber containing a rotatable shaft and incorporating in a system having means for passing a flowable material through the chamber at a controlled rate and at a controlled pressure. In addition, heat may be added to or taken from the material during its passage through the chamber thus permitting the temperature of the material to be raised, lowered, or maintained at a particular value. Attached to the shaft and cooperating with means attached to the stationary portions of the apparatus adjacent one end of the chamber is a combined pumping impeller and mixer structure serving to mix the material in a violent manner and to effect a recirculation of a desired amount of the material through the mixing stage.

Referring now to Fig. 1, a system embodying the invention in the processing of angel food cake batter, a material particularly difficult to process and chosen therefore as an illustration of the capabilities of the invention, is disclosed. The ingredients to be used in the preparation of the batter, such as egg white, sugar, flour, cream of tartar, salt and other materials embodied in the formula are placed in one of the alternately used pre-mixing tanks 1 and 2 and mixed by one of the agitators 3 and 4, driven by motors 5 and 6, respectively. The respective tanks are equipped with heat exchange means, such as coils 7 and 8, so as to enable the premixed material to be discharged through outlets 9 and 10 at a desired temperature. Each outlet is connected jointly to a common conduit 11 leading to a pump 12, driven by a suitable motor 13. Valves 14 and 15 are provided for regulating the flow at the desired time and in the desired manner into the pump from the batch pre-mixing tanks.

Pump 12 discharges the pre-mix into conduit 23 leading into an aperture provided in the cover 24 which is removably mounted at the inlet end of the pressure chamber, later to be described. When it is desired to provide a particular gaseous or liquid fluid in the material to be processed, we provide a supply tank 54 of such fluid, which tank is connected to pump 12 through conduit 25. The fluid in this tank may be maintained under a suitable pressure which may be higher than that of pump 12 and the tank may incorporate a throttling valve 16 through which the fluid passes on its way into conduit 25. Any conventional means for metering the fluid may be used. For example, a meter 17 and a selectively controlled regulating valve 18 may be incorporated in conduit 25, while a branch conduit 19 having a regulating valve 20 therein may serve to by-pass pump 12 and to direct the supplemental fluid into conduit 23 downstream from the pump, whenever this practice is desired.

Heretofore, in the processing of flowable materials in apparatus of this general type, it has been proposed to whip the material at the outlet end of the pressure chamber and in Vogt Patent 1,911,731 one means for accomplishing this procedure is disclosed. In contrast therewith, our invention not only accomplishes that whipping action, but also provides a more violent mixing by the positive pumping of the material and by the recirculation of a substantial and controlled portion of the pumped material through the whipping stage for additional whipping. While we prefer to employ our pumping and recirculation means at the inlet end of the pressure chamber, as shown by the drawings herein, it is within the purview of the invention to employ it at the outlet end of the chamber, or at both the inlet and outlet ends thereof.

Considering now the arrangement of Fig. 1, the flowable material enters the pressure chamber under pressure through an aperture 25a in cover 24 connected to conduit 23 and moves toward the central axis of that chamber. The cover may have an axial opening 26 for receiving a mounting stub shaft 27 attached to stub shaft end 40 of the main shaft by a suitable coupling 28 and sealed to the cover by a suitable seal 29. The pressure chamber in the form as shown includes an elongated stationary cylindrical wall 30 encompassed by a jacket 31 to provide an annular space 32 through which a suitable heat exchange medium may be circulated for the purpose of heating, cooling or maintaining the temperature of the flowable material passing through the chamber, if necessary. Suitable insulation 33 may surround the jacket and hot fluid may be supplied through a conduit 34 controlled by valve 35, while cold fluid may be supplied through a conduit 36 controlled by valve 37, the heat exchange medium in either case passing from the jacket through an outlet conduit 38. When processing materials characterized by their heats of reaction, heat of solution and the like, it may be desirable to effect an increased heat exchange in the region of the violent mixing stage of the apparatus and, in such cases, the annular space 32 may be extended to encompass the periphery of the entire mixing space, whereas, in the drawings, such annular space is shown as encompassing about half of that periphery.

Within the chamber a suitable shaft 39, having an enlarged diameter central portion and reduced diameter stub ends 40 and 41, is mounted, being adapted to be driven from one end as by means of motor 42. Between the surface of the enlarged diameter portion of the shaft and the smooth peripheral inner wall 30 of the chamber, a relatively thin annular space 43 is provided for passage of the material longitudinally of the chamber. Mounted upon shaft 39, preferably in fixed relation thereto and in overlapping longitudinal relation to each other is a plurality of angularly spaced blades 44, 45, 46, and 47 adapted to remove material from contact with the surface of the chamber wall 30.

At the outlet end of the chamber a removable cover 50 is suitably affixed thereto, this cover having a recess with which an outlet conduit 51 controlled by an adjustable back pressure valve 52, is in communication. The setting of this back-pressure valve exerts a marked influence on the throughput of processed material and upon the degree of mixing to which the material is subjected, as will later appear. In passing many flowable materials through the described apparatus or through such an apparatus equipped with supplemental whipping means as disclosed for example in the afore-mentioned Vogt patent, satisfactory processing results may be secured. However, for materials requiring violent mixing, the apparatus described may not, in certain cases, produce the desired final product.

As a significant feature of the present invention, therefore, we provide a mixing means which can be readily incorporated into an existing apparatus of the described type and which not only increases substantially the capability of that apparatus to handle a greater variety of flowable materials, but also to carry out processing operations which the conventional apparatus cannot perform. Referring now to Figs. 3 and 4, we mount upon the reduced diameter stub shaft 40 of the main shaft, a centrifugal pump impeller having a plurality of uniformly spaced, radially extending blades 60, 61, 62, 63, 64 and 65, the back walls of which abut against the annular face of the main shaft confronting the front cover 24 of the pressure chamber, these blades being securely affixed, as by welding, to a suitable sleeve 58 which may be removably attached to stub shaft 40 by means of set screws 59. If desired, the blades may be affixed at their root circle directly to that stub shaft and the sleeve may be omitted. At their front walls, each blade is joined by an annular pump wall 66 fitting into a suitable recess in each of the blades and terminating in a central opening 67 adjacent the surface of sleeve 58. The radial length of each of the pump impeller blades is such as to extend into annular space 43 but to provide a secondary space between the tips of the blades and the peripheral wall 30 of the pressure chamber. In addition, the axial width of the pump impeller blades is such as to provide substantial space 68 between pump wall 66 and the inner wall of cover 24, thus to insure adequate room for both incoming and recirculated material. It will be understood that other types of pumping arrangements which do not have a positive displacement pumping action, such as a turbine pump, may be used in lieu of the centrifugal pump arrangement herein described. Accordingly, the term "centrifugal pump" is intended to cover generally the class of rotatable pumps which do not have a positive displacement.

Rigidly affixed to the pump impeller wall 66 and projecting into space 68 is a plurality of concentric arrays of mixing pins indicated generally at 69 and 70, each array having a plurality of small spaced pins, for example, about 3/16 inch in diameter. Each pin, moreover, has a length sufficient to locate the path of the outer end thereof closely adjacent the surface of the stationary cover. Cooperating with the thus described pins is a plurality of concentric arrays of mixing pins indicated generally at 71 and 72 and rigidly affixed to the inner wall of the cover, each of these arrays having a plurality of spaced pins therein. Each of arrays 71 and 72 are located on radii sufficiently different in length from the radii of arrays 69 and 70 to permit a relative rotation of the pins thereof, but sufficiently close in length to cause material moving radially inwardly of space 68 to pass through closely spaced shearing zones established by relative movement of the pins. Moreover, each of the pins of arrays 71 and 72 has a length sufficient to locate the outer end thereof closely adjacent the surface of the rotatable pump impeller wall 66. It will be understood that the pins may be of any desired cross section and are not necessarily limited to the circular cross section, as shown.

Referring now to Fig. 5, as a significant feature of the invention, we provide a plurality of elongated pins, here shown as four in number at 73, 74, 75 and 76 and serving as vanes for directing the flow of a portion of the material leaving the pump impeller blades. These pins are rigidly mounted upon the cover 24 in a cantilever-type manner. It will be understood that the number of these pins or vanes may vary, depending upon the amount of material required to be recirculated and upon the back pressure, throughput, heat exchange and other factors incidental to a given processing treatment. However, since the cover 24 is removable, a given apparatus may be provided with more or less of these redirecting vanes merely by changing the cover 24 and without further modification of the overall system. Each redirecting pin or vane has a length sufficient to locate its free end axially a substantial distance inwardly of the pump wall 66 and, if desired, may extend to a point corresponding to the entire amount of the axial width of the pump impeller blade, as diagrammatically shown in Fig. 6. The vane moreover is provided with a smooth curve so that the free end thereof faces the direction of centrifugal flow of material leaving the pump impeller and in addition is transversely curved between its ends to cause the free end thereof to lie in the annular secondary space between the tips of the pump impeller blades and the periphery of wall 30. As an alternative to the mounting of the redirecting vanes upon the removable cover 24, the vanes may be formed as an integral part of the inner wall of the pressure chamber. It is further contemplated that in the processing of particular materials, a plurality of mixing spaces, each having its related pumping and mixing means, may be arrayed longitudinally of the shaft axis adjacent each other. In such a modification of the apparatus, the use of redirecting vanes attached to the inner wall of the processing chamber is particularly desirable. However, as shown, we prefer to employe a removable cover having the redirecting vanes attached thereto due to ease of substitution of one cover for another. It will be apparent also that the basic system may be employed with substitution of one shaft unit with its pumping and mixing attachments for another shaft unit, either with or without substitution of a particular cover. Thus, the flexibility of the apparatus for handling a wide range of flowable materials of greatly different characteristics is enhanced.

As seen in Fig. 6, material in mixing space 68 during operation of the apparatus is drawn into pumping inlet 67 near the shaft axis; subjected to centrifugal force; and thrown into contact with the redirecting vanes. A portion of this material then slides along the vanes back into the space 68 and another portion escapes into the annular space 43 of the pressure chamber. The ratio of the portion which moves into space 43 with respect to the portion which is recirculated is related to the flow rate through the apparatus as determined by the setting of valve 52 and the volume discharged by pump 12. For a material requiring violent mixing, such as angel food cake batter, it is desirable that a substantial portion of the material to be repeatedly recircuated through the shearing zones in the mixing space and by means of our invention this may be readily accomplished merely by adjusting the flow rate and without requiring unduly high speed of shaft 39. Since the peripheral velocity of the outer array of pins 69 is greater than the peripheral velocity of the inner array of pins 70 and since the pressure existing at the pumping inlet is less than the pressure at the tips of the pump impeller blades, material entering space 68 from conduit 23 flows toward pumping inlet 67 and does not bypass the pump impeller. As will be apparent, with a material including a gaseous fluid, the higher the back pressure maintained in an annular space 43 by valve 52, the greater will be the amount of material recirculating into mixing space 68 due to compression of that gas, other factors being equal. Likewise, the higher the speed of shaft 39, the greater will be the amount of material recirculating into the mixing space, other factors being equal.

The greater the speed of shaft 39 the more violent will be the mixing action imparted to the recirculated materials as it is moved by the pump impeller and through the shearing zones defined by the cooperating rotating and stationary pins in the mixing space. However, we have found that due to the described arrangement of the pumping structure with its axial inlet and the required centripetal movement of recirculated material moving from the pumping outlet back to the pumping inlet, we are enabled, to achieve a more violent mixing with a lesser shaft speed than is possible with previous arrangements of which we are aware, such as shown in the aforementioned Vogt patent. It will be understood that any desired number of arrays of pins and number of pins in each array, subject to the physical limitation of the pump impeller wall 66 and cover 24, may be employed, and that the arrangement shown in the present drawings is illustrative only and is not intended as a limitation on the design of the mixing apparatus. In general, the greater the number of pins in each array, the more violent the mixing for a given shaft speed, other factors being equal.

As an illustration of the operation of the described apparatus in the processing of angel food cake batter and when employing an apparatus having a tube 30 which is 6 inches in inside diameter and 24 inches long, we are enabled to process as much as 1400 pounds per hour of batter with a shaft speed of about 1600 r.p.m. and a back pressure of 100 p.s.i.g., and at the same time, provide a batter specific gravity of about 0.33. With conventional angel food batters, specific gravity is seldom below 0.35, thus indicating the enhanced mixing and the violence of such mixing afforded by our invention.

Various new and important processes may be carried out in systems including the apparatus as illustrated herein, but in the present application only the apparatus is being claimed.

In accordance with the patent statutes, we have described what at present is considered to be the preferred embodiment of our invention, but it will be obvious to those skilled in the art that various changes and modifications may be made therein without departing from the true spirit and scope of the invention and we, therefore, aim to cover in the appended claims, all such equivalent variations and modifications.

What we claim as new and desire to secure by Letters Patent of the United States is:

1. In an apparatus for processing flowable materials, an elongated chamber having a substantially cylindrical peripheral wall, an inlet at one end and an outlet at the other end to permit flow of material generally lengthwise through said chamber, an elongated substantially cylindrical rotatable shaft in said chamber defining an annular space between said shaft and said peripheral wall and having a reduced diameter adjacent one end of said chamber, means for driving said shaft, a cover for said chamber mounted thereon at said one end and spaced from the confronting face of said reduced diameter shaft to provide an enlarged mixing space communicating with said annular space, a pump impeller mounted on said shaft adjacent said mixing space, said pump impeller having an inlet receiving material from said mixing space adjacent the axis of said shaft and an outlet directing material toward said peripheral wall, vane means mounted adjacent said pump impeller outlet for redirecting a portion of the pumped material into the pump impeller inlet thereby to provide a recirculation of said material through said mixing space prior to discharge from said apparatus, and means in said mixing space for violently mixing said recirculated material.

2. Apparatus as defined in claim 1 wherein said inlet to said chamber is through said mixing space.

3. In an apparatus for processing flowable materials, an elongated chamber having a substantially cyindrical peripheral wall, an inlet at one end and an outlet at the other end to permit flow of material generally lengthwise through said chamber, an elongated substantially cylindrical rotatable shaft in said chamber defining an annular space between said shaft and said peripheral wall and having a reduced diameter adjacent one end of said chamber, means for driving said shaft, a cover for said chamber, mounted thereon at said one end and spaced from the confronting face of said reduced diameter shaft to provide an enlarged mixing space, a centrifugal pump impeller mounted on said shaft adjacent said mixing space, said pump impeller having an inlet receiving material from said mixing space adjacent the axis of said shaft and an outlet directing material toward said peripheral wall, said pump impeller outlet being spaced from said peripheral wall to form a secondary space communicating said mixing space with said annular space, stationary vane means mounted adjacent said pump impeller outlet and projecting into said secondary space for redirecting a portion of the pumped material into the pump impeller inlet, and means in said mixing space for violently mixing said redirected material.

4. Apparatus as defined in claim 3 wherein said vane means comprises longitudinally curved members having an end thereof facing the direction of centrifugal flow of material from said pump impeller.

5. Apparatus as defined in claim 4 wherein said curved members are additionally curved transversely between their ends to dispose the redirecting portions thereof uniformly in said secondary space.

6. In an apparatus for processing flowable materials, an elongated chamber having a substantially cylindrical peripheral wall, an inlet at one end and an outlet at the other end to permit flow of material generally lengthwise through said chamber, an elongated substantially cylindrical rotatable shaft in said chamber defining an annular space between said shaft and said peripheral wall and having a reduced diameter adjacent one end of said chamber, means for driving said shaft, a cover for said chamber mounted thereon at said one end and spaced from the confronting face of said reduced diameter shaft to provide an enlarged mixing space communicating with said annular space, a plurality of concentric rings of mixing pins attached to said cover and projecting into said mixing space, a centrifugal pump impeller mounted on said shaft adjacent said mixing space and having a plurality of concentric rings of mixing pins attached to a wall of said impeller and projecting into said mixing space for coaction with said first-mentioned mixing pins, said pump impeller having an inlet receiving material from said mixing space adjacent the axis of said shaft and an outlet directing material toward said peripheral wall, and vane means mounted adjacent the pump impeller outlet and projecting into the space between said pump impeller wall and said peripheral wall for redirecting a portion of the pumped material into the mixing space for passage between the relatively moving pins and into the pump impeller inlet.

7. Apparatus for processing flowable materials including an elongated pressure chamber having a substantially cylindrical peripheral wall, a pump for moving material into said chamber at one end thereof and a conduit for removing material from said chamber at the other end thereof, a valve in said conduit for regulating the throughput of material in said chamber, an elongated substantially cylindrical rotatable shaft in said chamber defining an annular space between said shaft and said peripheral wall and having a reduced diameter adjacent one end of said chamber, means for driving said shaft, a cover for said chamber mounted thereon at one end and spaced from the confronting face of said reduced diameter shaft to provide an enlarged mixing space communicating with said annular space, a centrifugal pump impeller mounted on said shaft adjacent said mixing space, said pump impeller having an inlet receiving material from said mixing space adjacent the axis of said shaft and an outlet directing material toward said peripheral wall, vane means mounted adjacent said pump impeller outlet for redirecting a portion of the material pumped thereby into the pump impeller inlet thereby to provide a recirculation of said material through said mixing space, the quantity recirculated being dependent jointly upon the speed of said shaft and the throughput of material in said chamber as regulated by said valve, and means in said mixing space for violently mixing said recirculated material.

8. Apparatus as defined in claim 7 wherein said pump supplies material into said pressure chamber through said mixing space.

9. Apparatus as defined in claim 7 wherein said mixing means includes a plurality of concentric arrays of mixing pins attached to said cover and projecting into said mixing space and a plurality of concentric arrays of mixing pins attached to a wall of said centrifugal pump impeller and projecting into said mixing space for coaction with said first-mentioned pins whereby material redirected into said mixing space passes through shearing zones established by relative movement of said pins during its flow into the centrifugal pump impeller inlet and is violently mixed during such flow.

10. In an apparatus for processing flowable materials, an elongated chamber having a substantially cylindrical peripheral wall, a heat exchange jacket surrounding a substantial portion of said wall, means for supplying and removing a heat exchange medium into and from said jacket, an inlet at one end and an outlet at the other end of said chamber to permit flow of material generally lengthwise through said chamber, an elongated substantially cylindrical rotatable shaft in said chamber defining an annular space between said shaft and said peripheral wall and having a reduced diameter adjacent one end of said chamber, means for driving said shaft, a cover for said chamber mounted thereon at said one end and spaced from the confronting face of said reduced diameter shaft to provide an enlarged mixing space, a pump impeller mounted on said shaft adjacent said mixing space and said pump impeller having an inlet receiving material from said mixing space and an outlet directing material toward said peripheral wall, vane means mounted adjacent said pump impeller outlet for redirecting a portion of the pumped material into the pump impeller inlet thereby to provide a recirculation of said material through said mixing space prior to discharge from said apparatus, and means in said mixing space for violently mixing said recirculated material.

11. Apparatus as defined in claim 10 wherein said heat exchange jacket is arranged in operative relation to at least a portion of said mixing space whereby said material may receive heat treatment during recirculation and mixing thereof.

References Cited in the file of this patent

UNITED STATES PATENTS

| 26,880 | Brown | Jan. 24, 1860 |
| 1,765,386 | Wait | June 24, 1930 |
| 2,211,387 | Routh | Aug. 13, 1940 |